US011097190B2

(12) United States Patent
    Cantor

(10) Patent No.: US 11,097,190 B2
(45) Date of Patent: *Aug. 24, 2021

(54) METHODS AND SYSTEMS FOR ASSEMBLY OF CREWS FOR FACILITATING EXECUTION OF SOCIAL GAME ACTIVITY

(71) Applicant: Zynga Inc., San Francisco, CA (US)

(72) Inventor: Andres Cantor, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 16/540,045

(22) Filed: Aug. 13, 2019

(65) Prior Publication Data

US 2019/0366216 A1 Dec. 5, 2019

Related U.S. Application Data

(63) Continuation of application No. 15/669,826, filed on Aug. 4, 2017, now Pat. No. 10,376,789, which is a continuation of application No. 13/244,689, filed on Sep. 26, 2011, now Pat. No. 9,757,654, which is a continuation of application No. 13/079,775, filed on Apr. 4, 2011, now Pat. No. 9,707,486.

(60) Provisional application No. 61/446,991, filed on Feb. 25, 2011.

(51) Int. Cl.
    *A63F 13/00* (2014.01)
    *A63F 13/69* (2014.01)
    *A63F 13/87* (2014.01)
    *A63F 13/795* (2014.01)

(52) U.S. Cl.
    CPC ............ *A63F 13/69* (2014.09); *A63F 13/795* (2014.09); *A63F 13/87* (2014.09); *A63F 2300/556* (2013.01); *A63F 2300/575* (2013.01); *A63F 2300/609* (2013.01)

(58) Field of Classification Search
    CPC ........ A63F 2300/556; A63F 2300/5566; A63F 2300/609
    See application file for complete search history.

(56) References Cited

U.S. PATENT DOCUMENTS

| 2010/0216553 | A1* | 8/2010 | Chudley | ................. G06F 30/20 463/42 |
| 2010/0250687 | A1* | 9/2010 | Smith | ................... G06Q 20/382 709/206 |
| 2010/0287109 | A1* | 11/2010 | Li | ....................... G06F 11/3664 705/319 |

* cited by examiner

*Primary Examiner* — Omkar A Deodhar
*Assistant Examiner* — Eric M Thomas
(74) *Attorney, Agent, or Firm* — Penilla IP, APC

(57) ABSTRACT

Methods and systems are provided for enabling a user of an online game to assemble a crew of additional crew members for accessing a content item after completing a goal with the crew. One example method includes sending, from the one or more servers to a client of a user, data for displaying a crew assembly dialog that includes a graphical user interface (GUI). The crew assembly dialog allowing the user to select crew members for assembling the crew for the online game. Sending, from the one or more servers in response to a selection made at the GUI, a help request directed to the at least one crew member for response from the at least one crew member. The method further includes assembling the crew based on the selection of the user for the at least one crew member and response of the at least one crew member to the help request. The assembling of the crew enables the user to make progress in the online game.

19 Claims, 11 Drawing Sheets

METHODS AND SYSTEMS FOR ASSEMBLY OF CREWS FOR FACILITATING EXECUTION OF SOCIAL GAME ACTIVITY

CLAIM OF PRIORITY

This application is a continuation application that claims priority from U.S. patent application Ser. No. 15/669,826 filed Aug. 4, 2017 entitled "Methods and Systems for Assembly of Crews for Facilitating Execution of Social Game Activity", which is a continuation of U.S. patent application Ser. No. 13/244,689 filed Sep. 26, 2011 (U.S. Pat. No. 9,757,654, issued on Sep. 12, 2017), entitled "Methods and Systems for Assembly of Crews for Facilitating Execution of Social Game Activity", which is a continuation application of U.S. patent application Ser. No. 13/079,775 filed Apr. 4, 2011, (U.S. Pat. No. 9,707,486 issued Jul. 18, 2017), entitled "Apparatus, Method and System for Crew Mechanics in Multiplayer Games", which claims priority from U.S. Provisional Patent Application No. 61/446,991 filed on Feb. 25, 2011, entitled "Apparatus, Method and System for Crew Mechanics in Multiplayer Games", which all are herein incorporated by references.

RELATED APPLICATIONS

This application is also related to U.S. patent application Ser. No. 13/102,998, filed on May 6, 2011, which claimed priority from U.S. Provisional Patent Application No. 61/446,991, filed on Feb. 25, 2011, both of which are herein incorporated by reference.

This patent application disclosure document (hereinafter "description" and/or "descriptions") describes inventive aspects directed at various novel innovations (hereinafter "innovation," "innovations," and/or "innovation(s)") and contains material that is subject to copyright, mask work, and/or other intellectual property protection. The respective owners of such intellectual property have no objection to the facsimile reproduction of the patent disclosure document by anyone as it appears in published Patent Office file/records, but otherwise reserve all rights.

FIELD

The present innovations are directed generally to multi-player games, more specifically to online social gaming mechanics in distributed game architectures.

BRIEF DESCRIPTION OF THE DRAWINGS

The accompanying appendices and/or drawings illustrate various non-limiting, example, innovative aspects in accordance with the present descriptions.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Introduction

The APPARATUS, METHOD AND SYSTEM FOR CREW MECHANICS IN MULTIPLAYER GAMES (hereinafter "CMMG") receives social crew-based inputs via CMMG components from one or more and outputs a user-owned crew-developed virtual content item. Social gaming architectures may include a variety of mechanics to more intensively engage users in game play. One such mechanic involves providing a platform where users may collaboratively work with their friends over a social network to advance the game narrative and/or to add or unlock tiered content or stages. Involving a user's network may lead to a mutually beneficial increase in each user's time spent on game play as well as overall game subscribership. Other mechanics may also be advantageously woven with the collaborative crew, for example, these mechanics may include harvesting, energy-clicking, gifting and/or the like.

Figure 1:
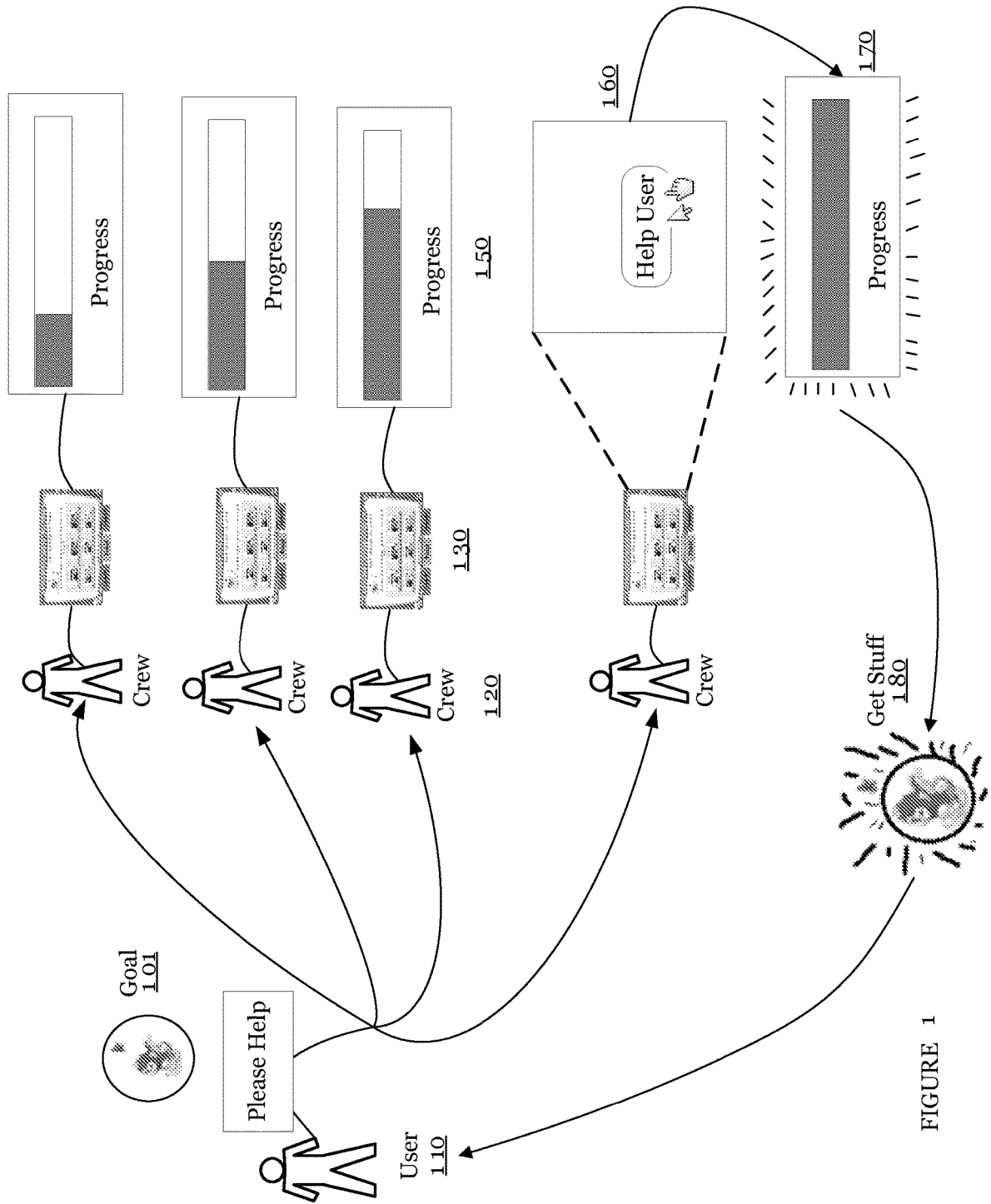
FIG. 1 illustrates an example of a CMMG embodiment.

FIG. 1 illustrates an example of a CMMG embodiment. As illustrated in FIG. 1, the multiplayer game environment may begin with providing a user 110 with access to limited or restricted content item. In one embodiment, the user may gain access to the content item by sending requests for help to a set of crew members 120. As crew members respond, a progress bar 150 dialog may indicate the progression towards obtaining access to the restricted content item. For example, a crew member response may include a mouse-click 160 on a help user interface object. In one embodiment, the user fills the progress bar 170 and the game unlocks the content item 180 for user access.

Figure 2:
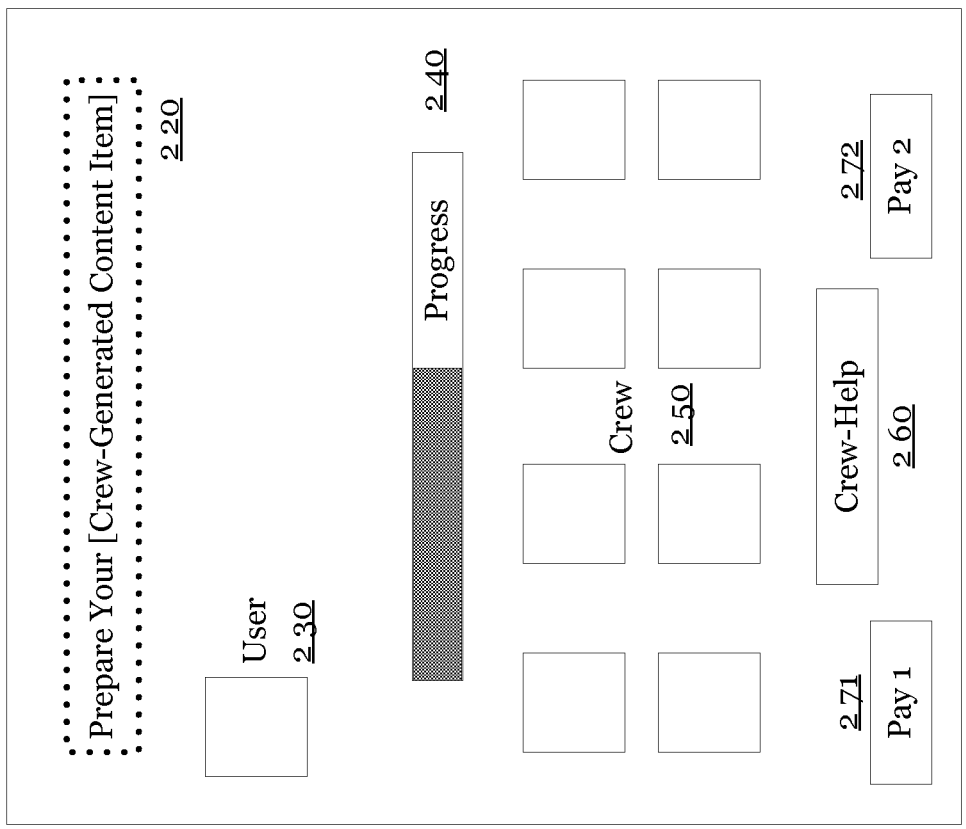
FIG. 2 illustrates an example of a CMMG dialog embodiment.

FIG. 2 illustrates an example of a CMMG embodiment. As illustrated in FIG. 2, a crew assembly dialog 210 may show a tailored interface with a crew-generated content item message 220 describing the locked content item. In one embodiment, the dialog may display a user/user icon 230, a progress bar 240 indicating the user's progression towards unlocking the content item, a crew 250, and a crew-help request form. In addition and/or in lieu of crew based assistance, the dialog may also present a pay 1 amount form 271 and a pay 2 amount form 272 allowing the user to pay, with real world and/or virtual currency, for access to the content item.

In one embodiment, users may use the content to gate social and/or use friends to get to new content (e.g. maps, terrascapes and the like). In one embodiment, socially defined gates may include a pre-determined number of crew members a user may have to obtain before achieving a level up or unlocking content items. In one implementation, the auto-complete features may be done by friends and the user's progress against a content goal may occur faster with involvement of friends in a crew-based or crew-optional task. For example, one crew implementation may leverage viral communication channels and/or opportunities to spread or distribute game play actions through social network data structures like a social graph, an adaptive array structure, a dynamically linked list and or the like, to get to a specified set of content items, e.g. maps, islands, virtual goods and/or the like. In one embodiment, the gate may be a hard gate or a soft gate and/or may depend on the size of users/crew social graph. For example, the size of a social graph may inform the type of gate.

The gated social crew mechanic may also be tiered in stages. The tiers may specify the type and/or number of crew members to complete a crew task or goal, e.g., unique crew member(s) and/or existing crew member(s) and perhaps a calculated ratio between the two. In one embodiment, a factors dialog may respond to a user's progress by introducing or displaying changes to a given dialog, progress bar, map display. In one embodiment, a user may proactively gift him or herself to another user wanting a crew. In one embodiment, a user may not be permitted to use the same friend in successive crew tasks or may not be permitted to assemble successive crews using the same combination of friends. In one embodiment, a crew-based goal may have a predetermined number of crew members and have an auto pop up feature reminding a friend to help a user complete a content item goal. In addition, an implementation may include a social wall-to-wall feed to request help from friends on a social network by posting to their walls that a given user's terrascape is in jeopardy, e.g. on fire. In one embodiment, a crew may have to have unique roles or responsibilities among its members in order to complete a collaborative task. In one embodiment, a user's friends may themselves have to have certain game play accomplishments or social profile attributes in order to be crew member eligible. In one embodiment, the crew mechanic may include a recursive gifting of a user to him or herself, whereby the user becomes part of his or her own crew and advances towards the goal of unlocking the next content item or reaching the next game stage.

Figure 3:
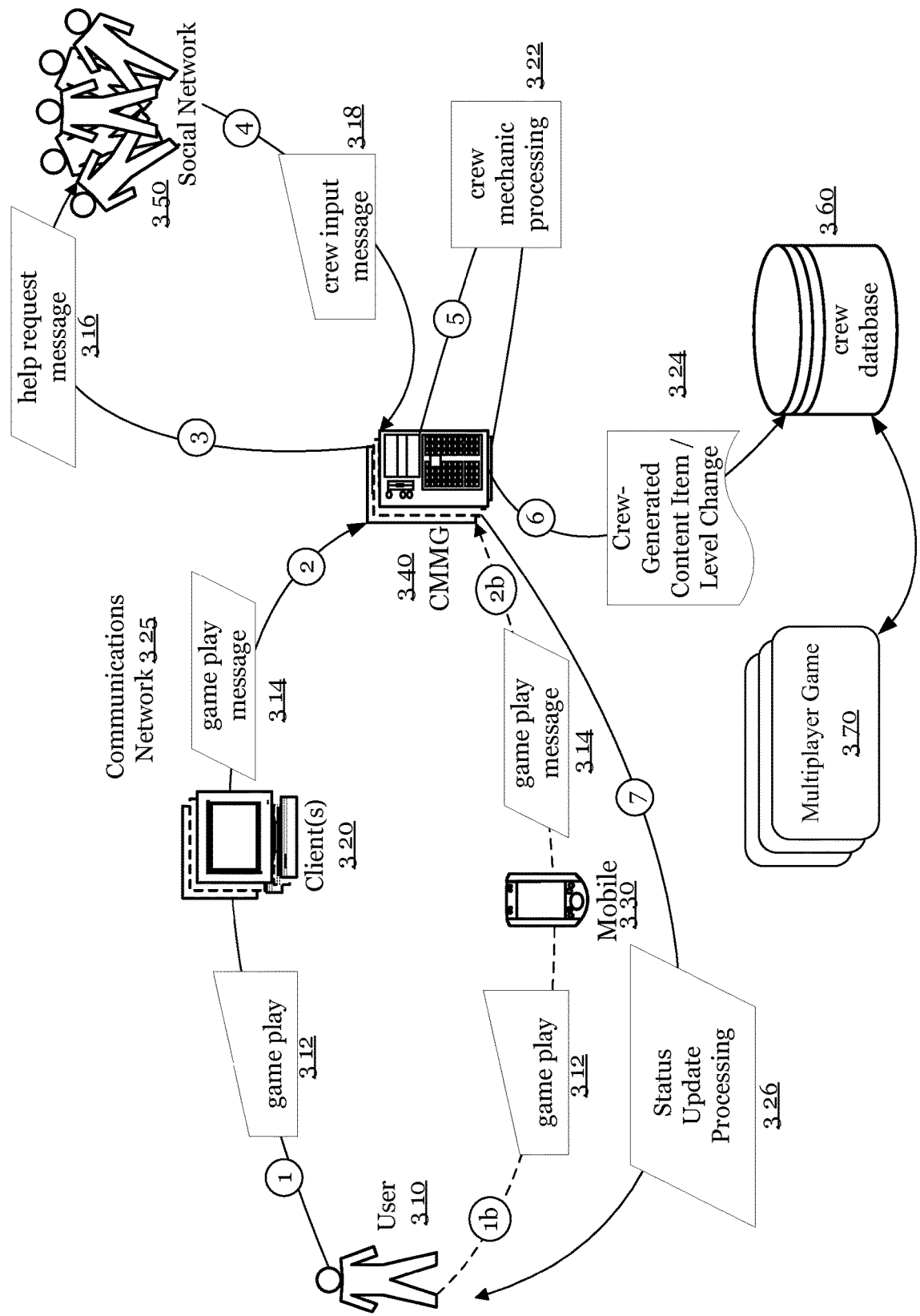
FIG. 3 illustrates an example data flow of CMMG operations.

FIG. 3 illustrates an example of a data flow of CMMG operations. As illustrated in FIG. 3, a user 310 may send game play 312 input to a game server 340 through client(s) 320, 330 and/or a mobile device(s) as game play messages 314. Below is an example of an HTTP(S) GET message including an XML-formatted play message for the CMMG:

```
GET /purchase.php HTTP/1.1
Host: www.cmmg.com
Content-Type: Application/XML
Content-Length: 1306
<?XML version = "1.0" encoding = "UTF-8"?>
<play_request>
   <selected crew member request>
      <crew1>
         <name>John Smith</name>
         <social_network>zynga_network</social_network>
         <username>jsmith</username>
      </crew1>
      <crew2>
         <name>Jane Doe</name>
         <social_network>facebook</social_network>
         <username>jdoe</username>
      </crew2>
      ...
      <crewN>
         <name>Jack Doe</name>
         <social_network>twitter</social_network>
         <username>janedoe</username>
      </crewN>
   </selected crew member request>
   <game request>
      <game_id>treasure_isle</game_id>
      <activity type>help</help>
      <msg_type>gift_crew_id1</msg_type>
      <social_network_message> can you help me saddle the dragon? you will get prizeid1 if you do</social_network_message>
      <crew_participant_offer>prizeID_1</crew_participant_offer>
      <requestor_selected_item>dragon saddle ID1234
      </requestor_selected_item>
   </game request>
</play_request>
</xml>
```

The CMMG server may process game input and send help messages 316 to prospective crew members 350 who may send crew input messages 318 to the server.

Below is an example of an HTTP(S) GET message including an XML-formatted help request message 316 for the CMMG:

```
GET /purchase.php HTTP/1.1
Host: www.cmmg.com
Content-Type: Application/XML
Content-Length: 1306
<?XML version = "1.0" encoding = "UTF-8"?>
<help_request_message>
   <targeted_crew_member>
      <crew1>
         <name>John Smith</name>
         <social_network>zynga_network</social_network>
         <username>jsmith</username>
         <password>password</password>
      </crew1>
   </targeted_crew_member>
   <game request>
      <game_id>treasure_isle</game_id>
      <activity type>help</activity type>
      <msg_type>gift_crew_id1</msg_type>
      <social_network_message>can you help me saddle the dragon? you will get prizeid1 if you do</social_network_message>
      <crew_participant_offer>prizeID_1</crew_participant_offer>
      <requestor_selected_item>dragon saddle ID1234
      </requestor_selected_item>
   </game request>
   <requestor_progress>0.5</requestor_progress>
</help_request_message_message >
</xml>
```

Below is an example of an HTTP(S) GET message including an XML-formatted crew input message 318 for the CMMG:

```
GET /purchase.php HTTP/1.1
Host: www.cmmg.com
Content-Type: Application/XML
Content-Length: 1306
<?XML version = "1.0" encoding = "UTF-8"?>
<crew_input_message>
   <targeted_crew_member>
      <crew1>
         <name>John Smith</name>
         <social_network>zynga_network</social_network>
         <username>jsmith</username>
         <password>password</password>
      </crew1>
   </targeted_crew_member>
   <game request>
      <game_id>treasure_isle</game_id>
      <activity type>help</activity type>
      <msg_type>gift_crew_id1</msg_type>
      <crew_participant_offer>prizeID_1</crew_participant_offer>
      <requestor_selected_item>dragon saddle ID1234
      </requestor_selected_item>
   </game request>
```

```
    <crew_input>yes</crew_input>
    <crew_prize_offer_accepted>yes</crew_prize_offer_accepted>
  </crew_input_message >
</xml>
```

With game play input and corresponding crew input, the CMMG server may conduct crew mechanic processing 322 and store crew generated content item and/or level change output messages 324 and/or database store/update commands on a crew database 360.

Below is an example of an HTTP(S) POST message including an XML-formatted crew generated output message 324 from the CMMG:

```
GET /purchase.php HTTP/1.1
Host: www.database.com
Content-Type: Application/XML
Content-Length: 1306
<?XML version = "1.0" encoding = "UTF-8"?>
  <crew_generated output message>
    <user_name>player_1</user_name>
    <game_id>treasure_isle</game_id>
    <msg_type>gift</msg_type>
    <crew_id1>player_2</crew_id1>
    <crew_id2>player_2</crew_id2>
    <crew_id3>player_3</crew_id3>
    <social_network>zynga_network</social_network>
    <password>12345</password>
    <content_status>unlocked</content_status>
    <current_level>10</current_level>
    <progress>user.progress+.1</progress>
  </crew_generated output message>
</xml>
```

In one embodiment, the database may communicate multiplayer game platform 370. In addition, the server may conduct status update processing 326 and send output to the user 310. Below is an example of an HTTP(S) POST message including an XML-formatted status update processing output 326 from the CMMG:

```
GET /purchase.php HTTP/1.1
Host: www.cmmg.com
Content-Type: Application/XML
Content-Length: 1306
<?XML version = "1.0" encoding = "UTF-8"?>
<status update processing message>
  <crew member activity>
    <crew1>
      <name>John Smith</name>
      <activity level contribution>10%
      </activity level contribution>
      <earned_crew_participant_gifts>no prize
      </earned_crew_participant_gifts>
    </crew1>
    <crew2>
      <name>Jane Doe</name>
      <activity level contribution>70%
      </activity level contribution>
      <earned_crew_participant_gifts>prizeID_1
      </earned_crew_participant_gifts>
    </crew2>
    ...
    <crewN>
      <name>Jack Doe</name>
      <activity level contribution>20%
      </activity level contribution>
      <earned_crew_participant_gifts>prizeID_1
      </earned_crew_participant_gifts>
    </crewN>
  </crew member activity>
```

```
  <game request>
    <game_id>treasure_isle</game_id>
    <activity type>help</activity type>
    <progress>100%</progress>
    <requestor_selected_item>dragon saddle ID1234
    </requestor_selected_item>
  </game request>
  <redemption_and_instantiation_link>
  www.getmyprizeandinstallitonthegame.com/code1
  </redemption_and_instantiation_link>
</status update processing message>
</xml>
```

In one embodiment, the status update processing output message 326, may be used as a crew generated output message 324 to update the crew database 360.

Figure 4:
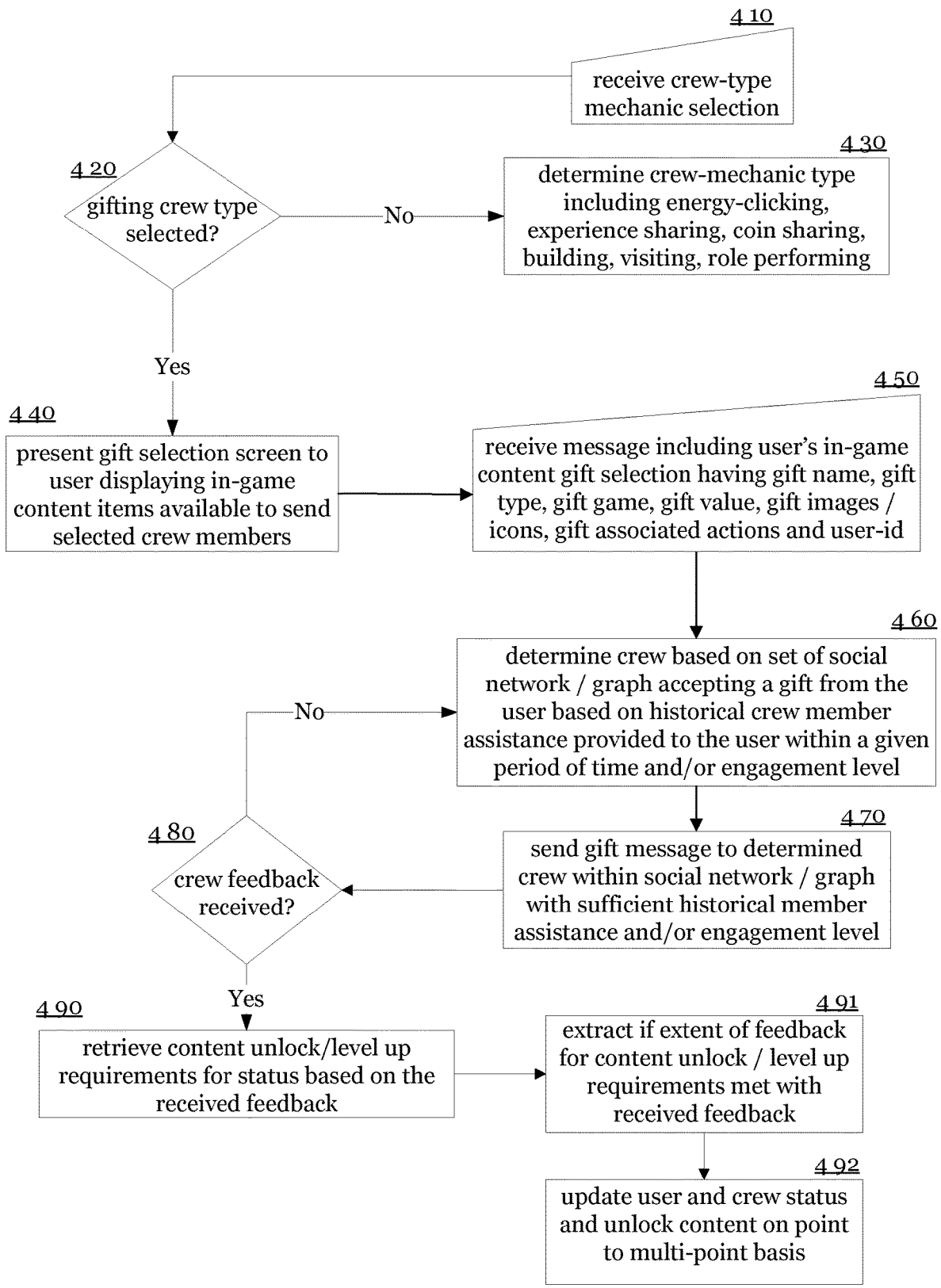
FIG. 4 illustrates an example logic flow of CMMG operations.

FIG. 4 illustrates an example logic flow of CMMG operations. As illustrated in FIG. 4, CMMG operations may include receiving a crew-type mechanic selection 410. Some of the selections may also include environments and operation modes. It should be noted that CMMG may be employed into separate and communicate in a point-to-point manner (e.g., users interacting w/one out of may associated friends in a game), but also in a point-to-multipoint manner where some or all of a user's friends may simultaneously, cooperatively, asynchronously, and/or independently interoperate and communicate with the user and/or the user's chose environment with the user and/or the user chose and objects (e.g. user allowing all of his/her friends to cooperate on a virtual playfield).

In one embodiment, logic flow operations may include the selection of the gifting crew mechanic crew-type 420. In one embodiment, logic flow operations may include determination of crew-mechanic type including energy-clicking, experience sharing, coin sharing, building, visiting and/or role performing 430. If selected, one implementation may present a gift selection screen to the user 440. In one embodiment, logic flow operations may include receiving message including the user's in-game content gift selection having gift name, gift type, gift game, gift value, gift images/icons, gift associated actions and a user-id 450.

In one implementation, logic flow may determine crew based on a set of social network/graph 460. In addition, logic flow operations may further include sending a gift message to the determined crew 470. In one embodiment, CMMG operations may check to determine if crew feedback was received 480. In one embodiment, no feedback may cause CMMG operations to continue determining crew based on set of social network/graph data. One embodiment of CMMG operations may include retrieving content-unlock/level-up requirements when feedback is received 490. In one embodiment, CMMG logic flow may include extracting if extent of feedback for content unlock/level-up requirements met 491 and updating user and crew status on a point to multi-point basis 492.

Figure 5:
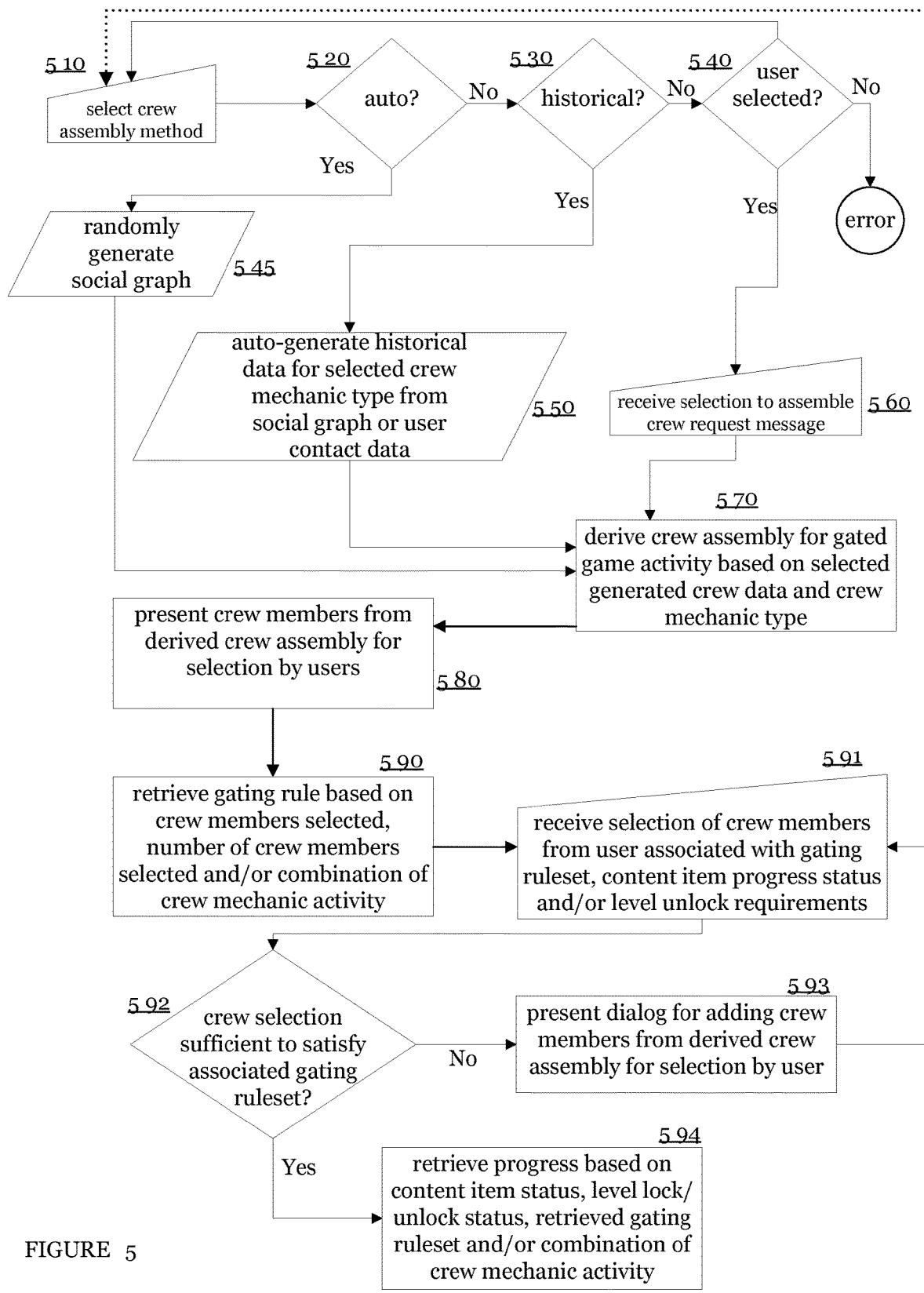
FIG. 5 illustrates an example logic flow of CMMG operations.

FIG. 5 illustrates example logic flow of CMMG operations. As illustrated in FIG. 5, CMMG operations may receive a select crew assembly method 510 input. In one embodiment, logic flow may include deciding if an auto 520, historical 530 a selected 540 process is utilized. In one embodiment, an auto selection may further include randomly generating a social graph. In addition, a historical selection may further include auto-generating historical data for selected crew mechanic type from social graph or user contact data. In one embodiment, a selected selection may further include receiving selection to assemble crew request message. In one embodiment, some crew may be ineligible based on a set of criteria. For example, if user received help from a crew member in building for the same content item goal, a crew member may be ineligible to help with that content item for a given period of time.

As illustrated in FIG. 5, CMMG operations may include deriving crew assembly for gated game activity based on selected generated crew data and crew mechanic type 570. In one embodiment, logic flow may include presenting crew members from derived crew assembly for selection by users 580. CMMG operations may further include retrieving gating rule based on crew members selected, number of crew members selected and/or combination of crew mechanic activity 590. As illustrated in FIG. 5, logic flow may include receiving selection of crew members from user associated with gating ruleset, content item progress status and/or level unlock requirements 591. In one embodiment, CMMG operations may determine if crew selection sufficient to satisfy associated gating ruleset 592. Logic flow may present a dialog for adding crew members from derived crew assembly for selection by the user if crew selection is insufficient 593. If crew selection is sufficient, logic flow may retrieve progress based on content item status, level lock/unlock status, retrieved gating ruleset and/or combination of crew mechanic activity 594.

In one embodiment, logic flow may include receiving crew for game dialog. In one implementation, the logic flow may further include presenting crew-input interface/progress. CMMG logic flow operations may further determine if application of a crew-based gating ruleset may be applied to the game dialog. In one embodiment, the determination may result in presenting the crew-input interface/progress and/or processing crew input according to gating ruleset. For example, the gating ruleset may increase the frequency of presenting a dialog to the user or crew members as the crew generated content item gets closer to completion.

Figure 6:
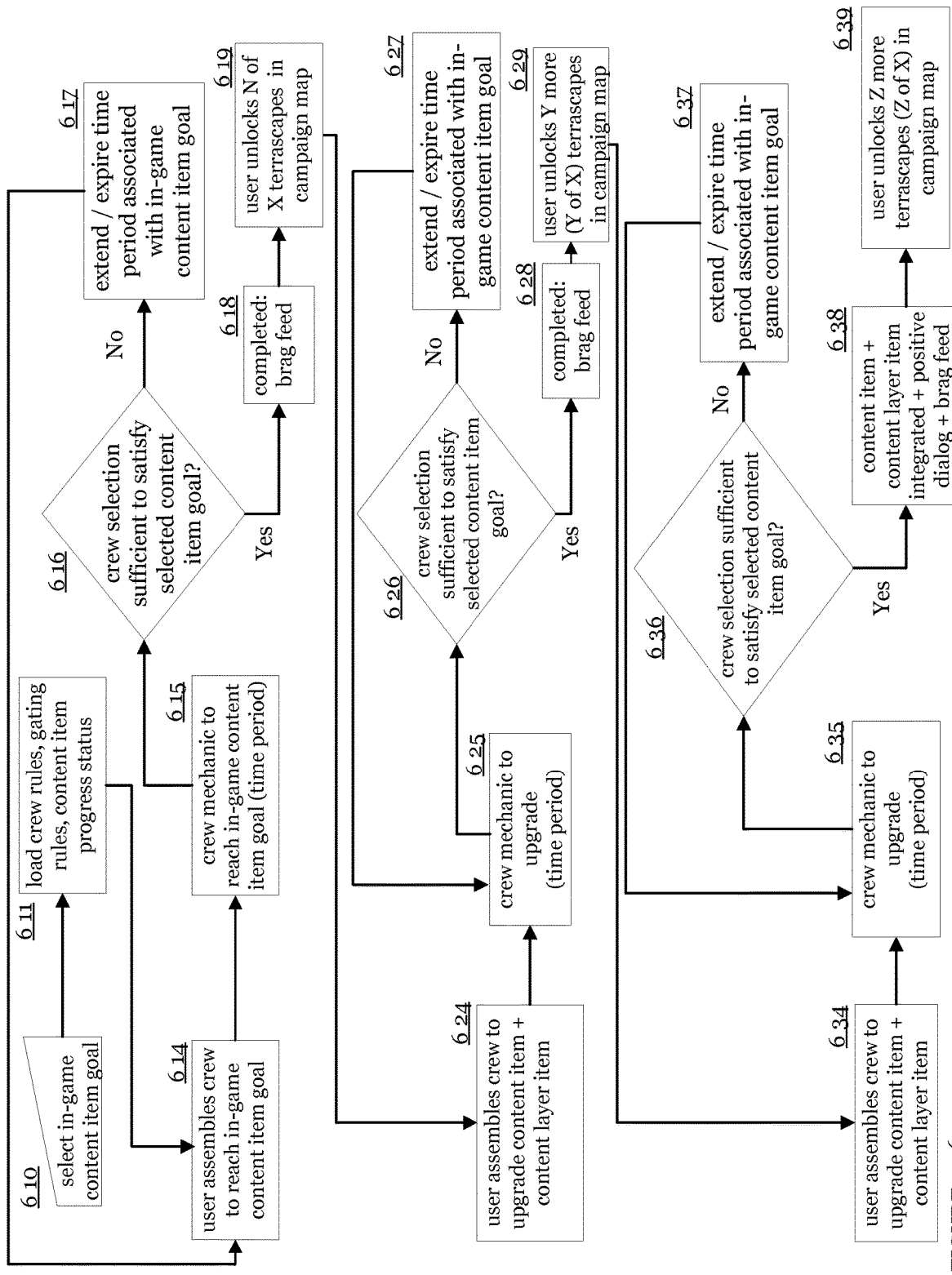
FIG. 6 illustrates an example logic flow of CMMG operations.

FIG. 6 illustrates an example logic flow of CMMG operations. As illustrated in FIG. 6, CMMG operations may include selecting an in-game content item goal 610. Logic flow may also include loading crew rules, gating rules, and content item progress status 611. In one embodiment, logic flow may include assembling crew to reach an in-game content item goal 614 and utilizing a crew mechanic to reach the in-game content item goal for a given time period 615. Logic flow operations may determine if a crew selection is sufficient to satisfy the selected content item goal 616. In one embodiment, an insufficient crew selection may further include extending and/or expiring a time period associated with the in-game content item goal 617. Where crew selection is sufficient, CMMG operations may further including completing a brag feed 618 by syndicating to a set social network feed and/or publishing the brag feed. In one embodiment, the logic flow may include unlocking a given N/X terrascapes in a game specific campaign map illustrates an example logic flow of CMMG operations.

FIG. 6 further illustrates an example logic flow of CMMG operations. As illustrated in FIG. 6, logic flow may include assembling crew to reach an in-game content item goal and content layer item 624 and utilizing a crew mechanic to reach the in-game content item goal for a given time period 625. Logic flow operations may determine if a crew selection is sufficient to satisfy the selected content item goal 626. In one embodiment, an insufficient crew selection may further include extending and/or expiring a time period associated with the in-game content item goal 627. Where crew selection is sufficient, CMMG operations may further including completing a brag feed 628 by syndicating to a set social network feed and/or publishing the brag feed. In one embodiment, the logic flow may include unlocking a given Y/X terrascapes in a game specific campaign map 629.

FIG. 6 further illustrates an example logic flow of CMMG operations. As illustrated in FIG. 6, logic flow may include assembling crew to reach an in-game content item goal and content layer item 634 and utilizing a crew mechanic to reach the in-game content item goal for a given time period 635. Logic flow operations may determine if a crew selection is sufficient to satisfy the selected content item goal 636. In one embodiment, an insufficient crew selection may further include extending and/or expiring a time period associated with the in-game content item goal 637. Where crew selection is sufficient, CMMG operations may further including completing a brag feed 638 by syndicating to a set social network feed and/or publishing the brag feed. In one embodiment, the logic flow may include unlocking a given Z/X terrascapes in a game specific campaign map 639.

As illustrated in FIG. 6, the logic flow may include a user receiving crew help input to reach an in-game content item goal and/or a crew mechanic to upgrade and/or reach in-game item goal over a given time period. In one embodiment, completion of the in-game content goal may result in a brag feed and/or the ability of the user to unlock an island or virtual terrascape in a campaign map. In one embodiment the completion of in-game content may also unlock further maps. As further illustrated in FIG. 6, the user may assemble crew to upgrade content item and a content layer item. In one embodiment, the crew mechanic to upgrade may be set over a given time period. In one embodiment, completion of the in-game content goal may result in a brag feed and/or the ability of the user to unlock an island or virtual terrascape in a campaign map. As illustrated in FIG. 6, the user may further iterate through a similar process in stages where the completion of a crew mechanic upgrade of a content item may lead to integration of the content item with a content layer item, (e.g. a dragon with a dragon saddle), a positive dialog and a brag feed.

In one embodiment, some of CMMG operations may be implemented as follows:

```
<?php
class CrewBuilding extends Decoration {
    const HELPER_DECREASE = 86400; //1 day
    const STATE_UPGRADING = 'upgrading';
    const STATE_DORMANT = 'dormant';
    const START_UPGRADE= 'startUpgrade';
    const RECRUIT_CREW = 'recruitCrew';
    const PAY_FOR_UPGRADE = 'payForUpgrade';
    const TIME_UPGRADE = 'timeUpgrade';
    public $timeCreated = 0;
    public $timeCompletion = 0;
    public $helpers = array( );
    public $stage = 1;
```

```
  public $status;
  public $buildingId;
  public function _construct( ) {
    parent::_construct( );
    $this->status = CrewBuilding::STATE_DORMANT;
  }
  public function getStage( ) {
    return $this->stage;
  }
  public function startUpgrade( ) {
    if ($this->isFullyUpgraded( )) {
      return;
    }
    $this->timeCreated = GameTime::time( );
    $this->timeCompletion = $this->getCompletionTime( );
    $this->status = CrewBuilding::STATE_UPGRADING;
  }
  public function finishUpgrade( &$user ) {
    $this->status = CrewBuilding::STATE_DORMANT;
    $this->stage++;
    $this->clearHelpers( );
  }
  protected function clearHelpers( ) {
    $this->helpers = array( );
  }
  /**
   * Adds the helper to this crew, if it is not full.
   *
   * @param string $userId UID to add
   * @return Boolean True if helper was added successfully
   */
  public function addHelper($userId, &$thisUser) {
    if (count($this->helpers) < $this->getNumRequiredHelpers( ) && $thisUser->id != $userId) {
      $this->helpers[ ] = $userId;
      return true;
    }
    return false;
  }
  public function getLifeSpanInDays( ) {
    // days to upgrade tied to number of helpers for this stage.
    return $this->getNumRequiredHelpers( );
  }
  public function getCompletionTime( ) {
    $lifeSpan = $this->getLifeSpanInDays( ) * 86400;
    $numHelpers = min(count($this->helpers), $this->getNumRequiredHelpers( ));
    return $this->timeCreated + $lifeSpan - ( $numHelpers * self::HELPER_DECREASE );
  }
  public function isComplete( ) {
    if ($this->status == self::STATE_DORMANT) {
      return false;
    }
    $this->timeCompletion = $this->getCompletionTime( );
    return $this->timeCompletion <= GameTime::time( );
  }
  public function costToComplete( ) {
    $result = 0;
    $item = GameConfigManager::getItemByName($this->itemName);
    $costPerDay = (int) $item["costToUpgrade"];
    $completionTime = $this->getCompletionTime( );
    $daysLeft = ceil(($completionTime - GameTime::time( )) / 86400);
    $result = $daysLeft * $costPerDay;
    // Multiply the cost of the price if there is no helpers (real or computer)
    if ( $this->canApplyPriceMultiplier( ) ){
      $result = $this->getPriceMultiplier( ) * $result;
    }
    return $result;
  }
  public function canApplyPriceMultiplier( ) {
    // apply price multiplier if it is the first day, and no one has helped.
    $completionTime = $this->getCompletionTime( );
    $daysLeft = ceil(($completionTime - GameTime::time( )) / 86400);
    $numActualHelpers = min(count($this->helpers), $this->getNumRequiredHelpers( ));
    return $daysLeft == $this->getLifeSpanInDays( ) && $numActualHelpers == 0;
  }
  public function getNumRequiredHelpers( ) {
    $item = GameConfigManager::getItemByName($this->itemName);
    $id = $this->getStage( );
    if ( $this->isFullyUpgraded( ) )
    {
```

```
      $id = $this->getMaxStage( ) - 1;
   }
   $result = (int) $item["stages"][$id]["numHelpers"];
   return $result;
}
public function isFullyUpgraded( ) {
   $item = GameConfigManager::getItemByName($this->itemName);
   return $this->stage >= (int) $item["maxStage"];
}
public function getMaxStage( ) {
   $item = GameConfigManager::getItemByName($this->itemName);
   return (int) $item["maxStage"];
}
public function getPriceMultiplier( ) {
   $result = 1;
   $item = GameConfigManager::getItemByName($this->itemName);
   if ( isset($item["priceMultiplier"]) && (int) $item["priceMultiplier"] > 0 ) {
      $result = (int) $item["priceMultiplier"];
   }
   return $result;
}
public function sell(&$user) {
   if ($this->isFullyUpgraded( ) || $this->className == "TemporaryCrewBuilding") {
      return parent::sell($user);
   }
   else
      return false;
}
}
class CrewBuildingService extends BuildingService {
   protected $m_canPlaceObject = true;
   /** @inherit */
   protected function getObjectType( ) {
      return "CrewBuilding";
   }
   public function onTimeUpgrade( ) {
      $user = &$this->getUser( );
      $cb = $this->m_serverSavedObject;
      if (!($cb instanceof CrewBuilding)) {
         return AmfUtils::packFault(AmfUtils::ACTION_METHOD_ERROR, "Invalid target");
      }
      if ($cb->isComplete( )) {
         return $this->finishUpgrade( );
      }
      return AmfUtils::packFault(AmfUtils::ACTION_METHOD_ERROR, "Failed to upgrade on time");
   }
   public function onPayForUpgrade( ) {
      $user = &$this->getUser();
      $cb = $this->m_serverSavedObject;
      if (!($cb instanceof CrewBuilding)) {
         return AmfUtils::packFault(AmfUtils::ACTION_METHOD_ERROR, "Invalid target");
      }
      $price = $cb->costToComplete( );
      if ($user->player->updateCash(-$price, "Crew_Building_Upgrade")) {
         return $this->finishUpgrade( );
      }
      return AmfUtils::packFault(AmfUtils::ACTION_METHOD_ERROR, "Failed to pay for upgrade");
   }
   public function onStartUpgrade( ) {
      $user = &$this->getUser( );
      $cb = $this->m_serverSavedObject;
      if (!($cb instanceof CrewBuilding)) {
         return AmfUtils::packFault(AmfUtils::ACTION_METHOD_ERROR, "Invalid target");
      }
      $cb = $this->m_serverSavedObject;
      $cb->startUpgrade( );
      $result = array("success" => true, "status" => $cb->status, "stage" => $cb->stage, "timeCompletion" => $cb->timeCompletion, "timeCreated" => $cb->timeCreated);
      return AmfUtils::pack($result);
   }
   public function finishUpgrade( ) {
      $cb = $this->m_serverSavedObject;
      $user = $this->getUser( );
      $cb->finishUpgrade($user);
      // After completing a stage, begin timer for next stage
      $cb->startUpgrade( );
      //$result = array("success" => true, "status" => $cb->status, "stage" => $cb->stage);
```

-continued

```
    $result = array("success" => true, "status" => $cb->status, "stage" => $cb->stage,
"timeCompletion" => $cb->timeCompletion, "timeCreated" => $cb->timeCreated);
        return AmfUtils::pack($result);
    }
}
?>
```

Figure 7:
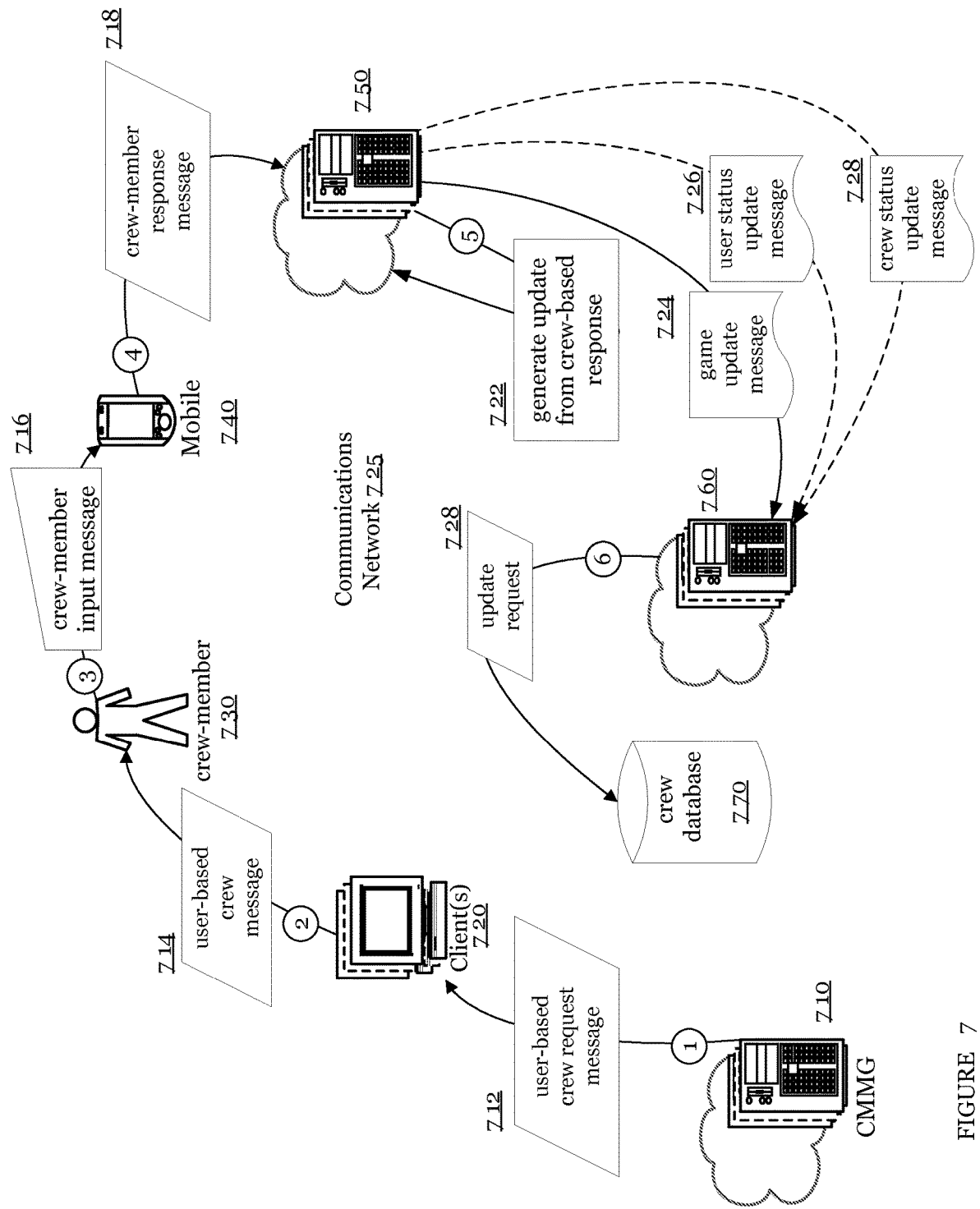
FIG. 7 illustrates an example data flow of CMMG operations.

FIG. 7 illustrates an example data flow for CMMG operations. As illustrated in FIG. 7, CMMG server may send a user-based crew request message 712, with reference back to FIG. 3, e.g., 316, to a client(s) 720. The client may process a user based crew message and send the user-based crew message 714 to a crew member 730. In one embodiment, the crew member may respond to the user based crew message by providing an input message 716 on a mobile device 740. Data flow for CMMG operations may further include processing a crew member response message 718, and with reference back to FIG. 3, e.g., 318, on a heterogeneous network 750. In one embodiment, data flow operations may include generating update messages 722 from crew-based response messages. For example, the communications network 725 may send a game update message 724, a user status update message 726 and/or a crew status update message 728 to a server 760. The server may then send an update statement process 728 to a crew database 770, see e.g., 326.

Figure 8:
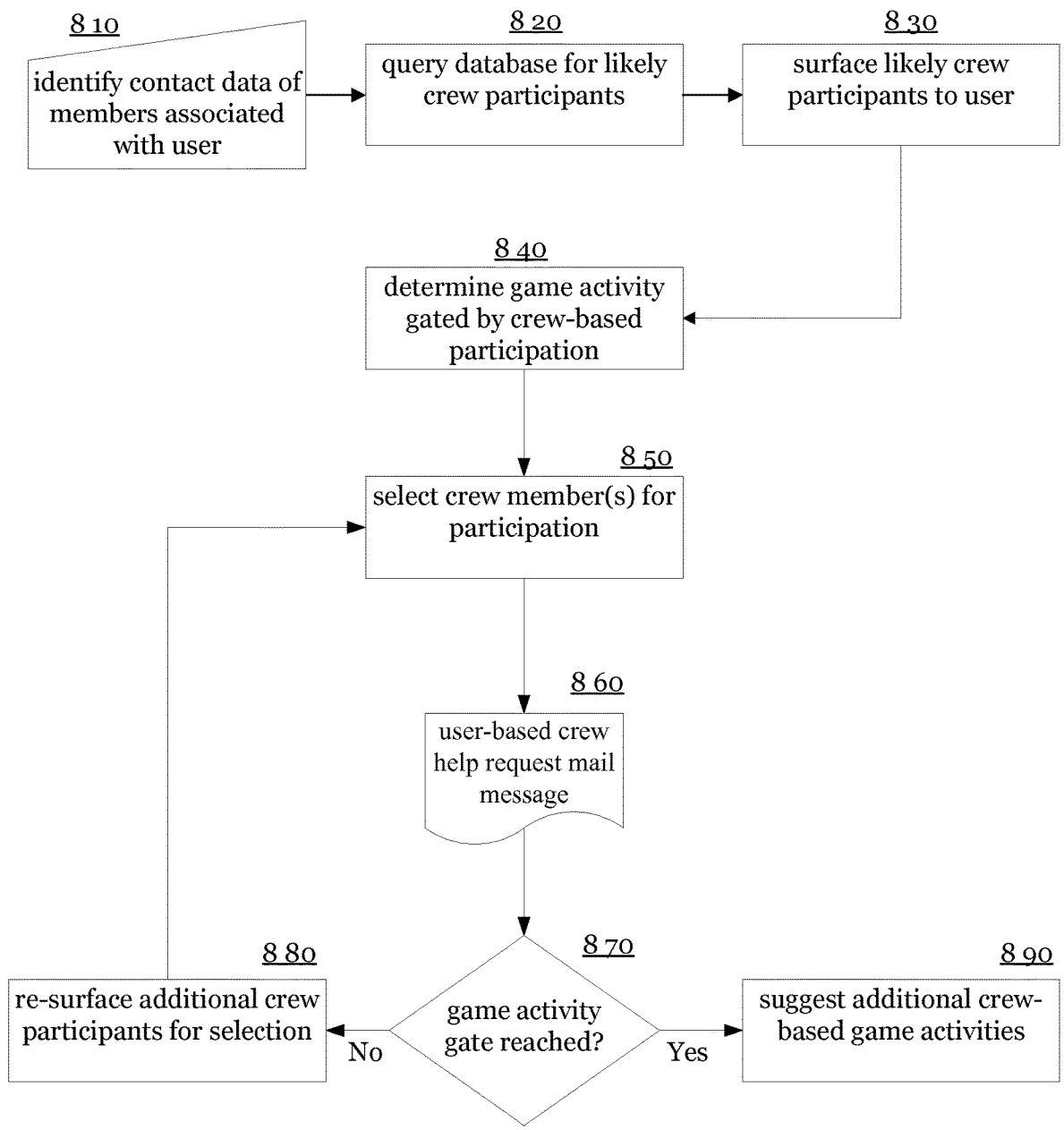
FIG. 8 illustrates an example logic flow of CMMG operations.

FIG. 8 illustrates an example data flow of CMMG operations. As illustrated in FIG. 8, data flow may include identifying contact data of members associated with a user 810. In one embodiment, data flow may include querying 820 a database for likely crew participants. CMMG operations may further include surfacing likely crew participants to a user 830. In one embodiment, data flow operations may include determining 840 game activity gated by crew-based participation. CMMG data flow operations may further include selecting crew members for participation 850. In one embodiment, the selection may output a user based crew help request mail message 860. According to FIG. 8, CMMG data flow operations may determine if a game activity gate has been reached 870. In one embodiment, where game activity gate is not reached, data flow operations may re-surface additional crew participants for selection 880. If a game activity gate is reached, data flow may suggest additional crew-based game activities 890.

Figure 9:
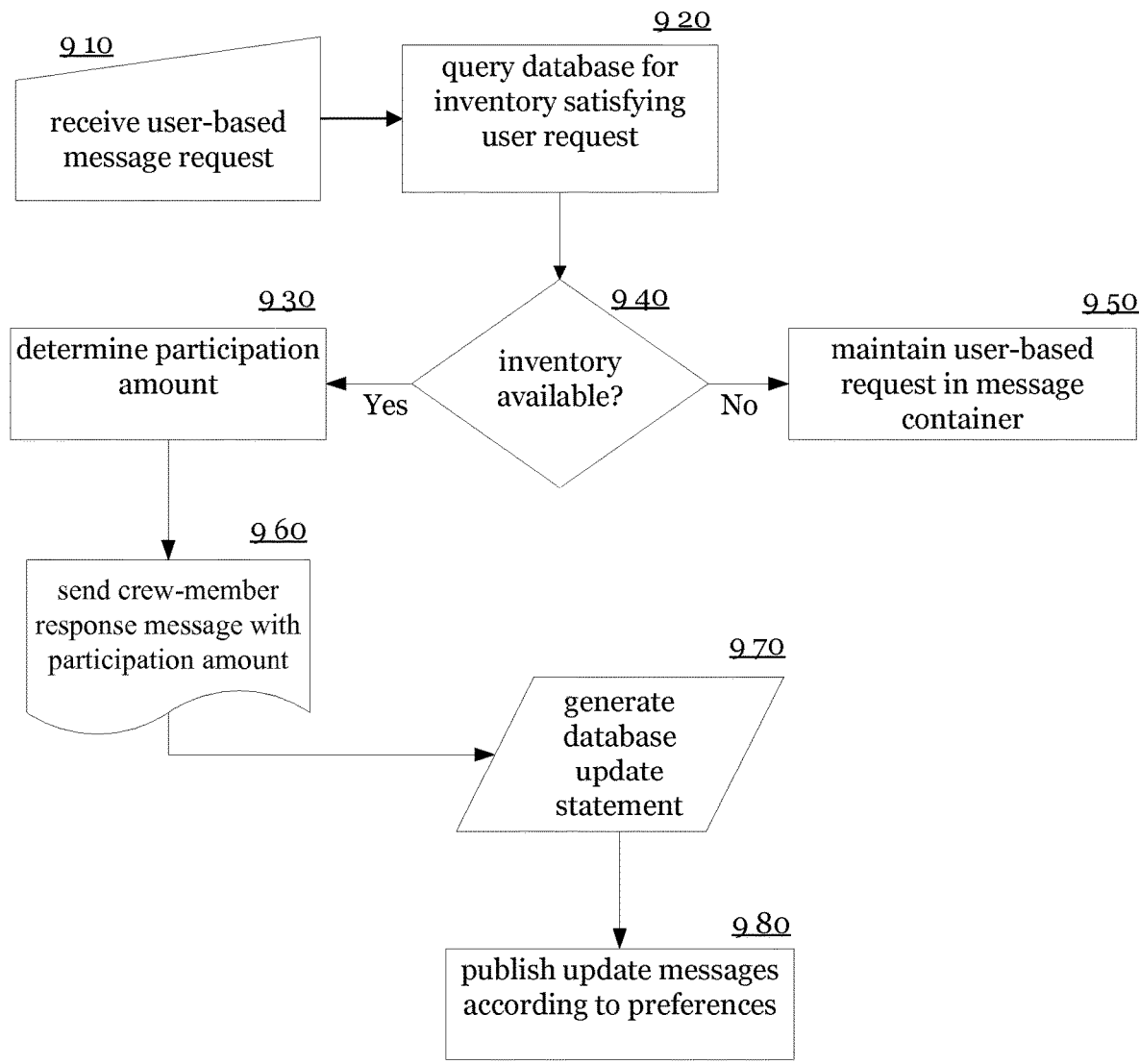
FIG. 9 illustrates an example logic flow of CMMG operations.

FIG. 9 illustrates an example logic flow according to CMMG operations. As illustrated in FIG. 9, CMMG operations may include receiving a user based message request 910. In one embodiment, logic flow of CMMG operations may include querying a database for inventory satisfying a user request 920. CMMG operations may determine if inventory is available 940 (e.g., if there are crew members available) If inventory is not available, logic flow of CMMG operations may include maintain a user-based request in a message container 950. If inventory is available, logic flow operations may determine a participation amount 930. In one embodiment, logic flow may include sending a crew-member response message with a participation amount 960. CMMG operations may further include generating a database update statement 970 and publishing update messages according to preferences 980.

Figure 10:
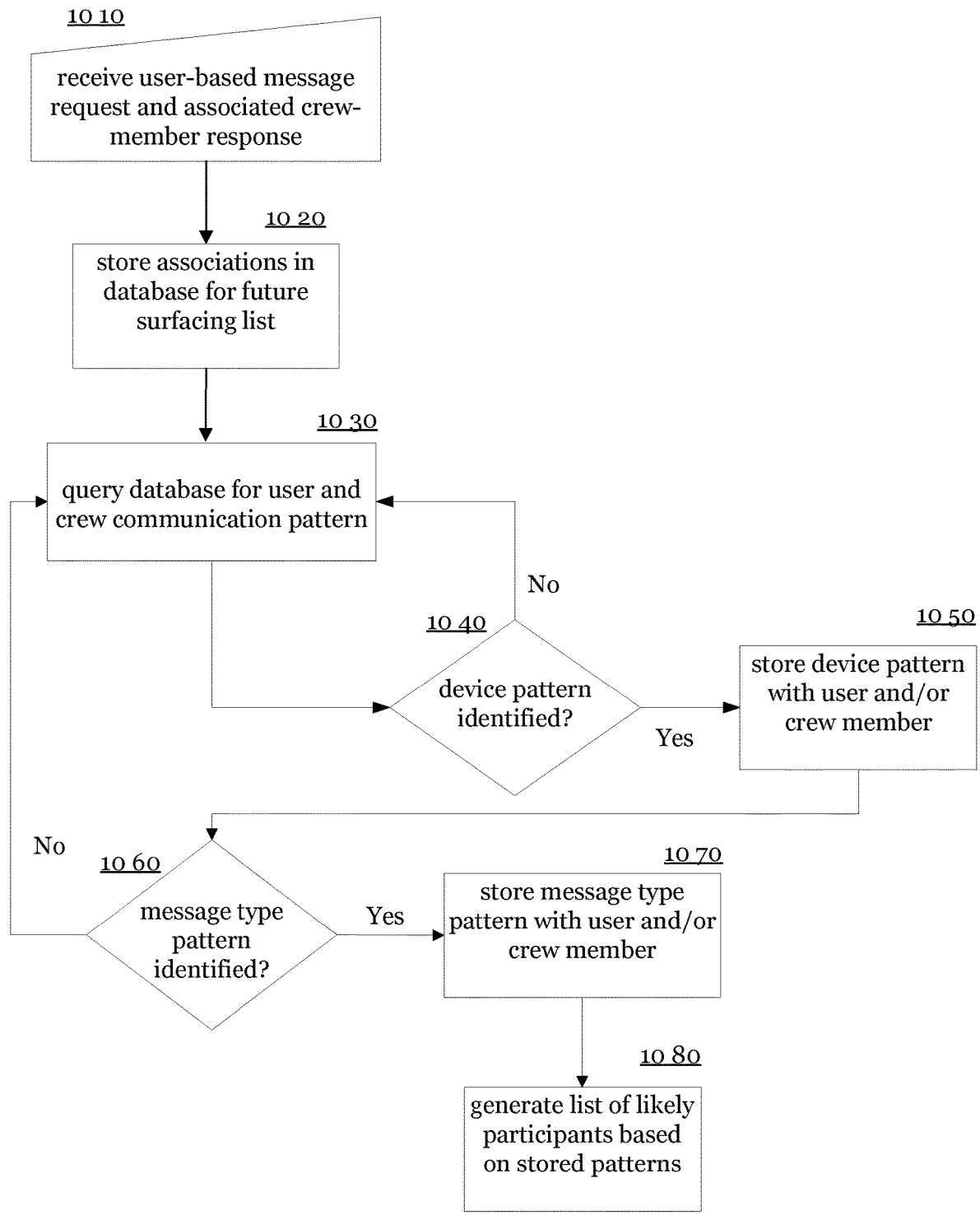
FIG. 10 illustrates an example logic flow of CMMG operations.

FIG. 10 illustrates one example of logic flow operations. As illustrated in FIG. 10, logic flow may include receiving user-based message request and an associated crew-member response 1010. In one embodiment, CMMG operations may include storing associations in a database for a future surfacing list 1020. Logic flow may include querying the database for user and crew communication patterns 1030. In one embodiment, where a device pattern is recognized 1040, logic flow may store the device pattern with a user and/or crew member 1050. According to one embodiment, the logic flow may identify a message type pattern 1060. Logic flow, in one embodiment, may store a message type pattern with a user and/or crew member associated with the message type 1070. In one embodiment, the logic flow operations may include generating a list of likely participants based on stored patterns 1080.

CMMG Controller

Figure 11:
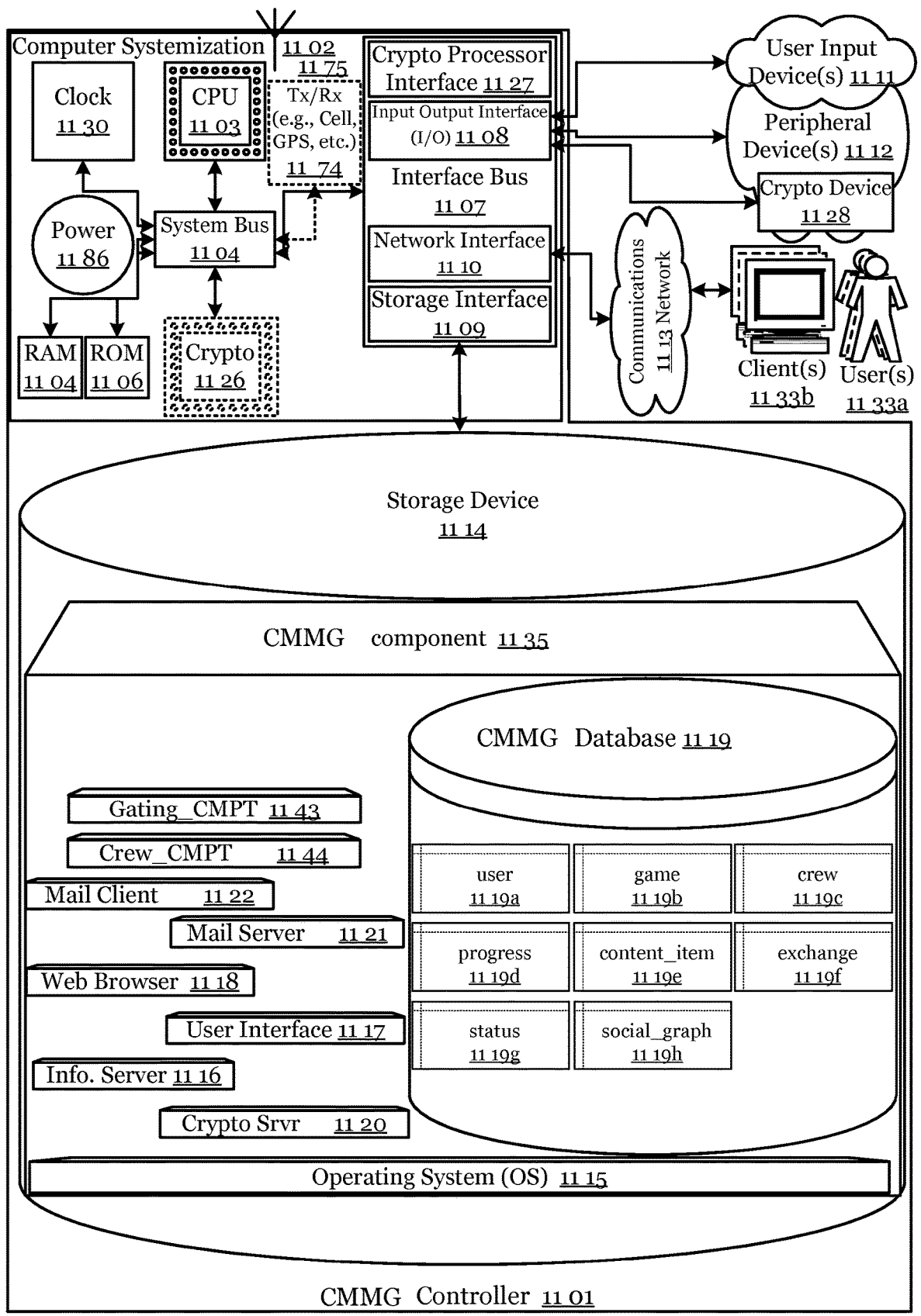
FIG. 11 illustrates a block diagram of a CMMG controller.

FIG. 11 shows one embodiments of the CMMG controller. In this embodiment, the CMMG controller 1101 may serve to aggregate, process, store, search, serve, identify, instruct, generate, match, and/or facilitate interactions with a computer through software, listing service and financial management technologies, and/or other related data.

Users may engage information technology (e.g., computers) to facilitate information processing. In turn, computers employ processors to process information; such processors 1103 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed include: input and output mechanisms through which data may pass into and out of a computer; memory storage into which data may be saved; and processors by which information may be processed. These information technology resources may be used to collect data for later retrieval, analysis, and manipulation, which may be facilitated through a database program.

In one embodiment, the CMMG controller 1101 may be connected to and/or communicate with: a processor 1103 or central processing unit ("CPU"); one or more users from user input devices 1111; peripheral devices 1112; an optional cryptographic processor device 1128; and/or a communications network 1113.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers and/or clients across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The CMMG controller 1101 may be based on a computer systemization 1102 connected to the CMMG component 1135. The APPARATUS, METHOD AND SYSTEM FOR CREW MECHANICS IN MULTIPLAYER GAMES (hereinafter "CMMG") transforms in game status of a user's social content item via CMMG components into a content item with layered integration of additional content indicative of status. In one embodiment, the CMMG component may include a gating_component 1143 and a crew_component 1144. Depending on the implementation, one or more of the noted components may operate on a dedicated server, performed through an associated cloud service or by using a hybrid cloud technique. The hybrid cloud technique may include using platform-oriented and/or service-oriented cloud architectures in combination with a dedicated server.

Computer Systemization

A computer systemization 1102 may comprise a clock 1130, central processing unit ("CPU(s)" and/or "processor(s)" (these terms are used interchangeable throughout the disclosure unless noted to the contrary)) 1103, a memory (e.g., a read only memory (ROM) 1106, a random access memory (RAM) 1104, etc.), and/or an interface bus 1107. These components may be interconnected and/or communicating through a system bus 1104 on one or more (mother)board(s) 1102 having conductive and/or otherwise transportive circuit pathways through which instructions (e.g., binary encoded signals) may travel to effectuate communications, operations, storage, etc. The computer systemization may be connected to a power source 1186. The power source may be external or internal to the respective computer systemization. A cryptographic processor 1126 and/or transceivers (e.g., ICs) 1174 may be connected to the system bus. In another embodiment, the cryptographic processor and/or transceivers may be connected as either internal and/or external peripheral devices 1112 via the interface bus I/O. The transceivers may be connected to antenna(s) 1175, thereby effectuating wireless transmission and reception of various communication and/or sensor protocols. For example, the antenna(s) may connect to: a Texas Instruments WiLink WL1283 transceiver chip (e.g., providing 802.11n, Bluetooth 3.0, FM, global positioning system (GPS) (thereby allowing CMMG controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock may include a crystal oscillator and generates a base signal through the computer systemization's circuit pathways. The clock may be coupled to the system bus and various clock multipliers that may increase or decrease the base operating frequency for other components interconnected in the computer systemization. The clock and various components in a computer systemization may drive signals embodying information. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in some embodiments, any of the above components may be connected directly to one another, connected to the CPU, and/or organized in numerous variations.

The CPU may comprise data processor adequate to execute program components for executing user and/or CMMG-generated requests. A processor may include specialized processing units. For example, a processor may include integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to data processing techniques. Such instruction passing facilitates communication within the CMMG controller and beyond through various interfaces. Should processing requirements dictate a greater amount speed and/or capacity, distributed processors (e.g., Distributed CMMG), mainframe, multi-core, parallel, and/or super-computer architectures may similarly be employed. Alternatively, should deployment requirements dictate greater portability, smaller Personal Digital Assistants (PDAs) may be employed.

Features of the CMMG may be achieved by implementing a microcontroller such as CAST's R8051XC2 microcontroller; Intel's MCS 51 (i.e., 8051 microcontroller); and/or the like. Some feature implementations may include embedded components, such as: Application-Specific Integrated Circuit ("ASIC"), Digital Signal Processing ("DSP"), Field Programmable Gate Array ("FPGA"), and/or the like embedded technology. For example, any of the CMMG component collection (distributed or otherwise) and/or features may be implemented via the microprocessor and/or via embedded components; e.g., via ASIC, coprocessor, DSP, FPGA, and/or the like. Alternately, some implementations of the CMMG may be implemented with embedded components that are configured and used to achieve a variety of features or signal processing.

The embedded components may include software solutions, hardware solutions, and/or some combination of both hardware/software solutions. For example, CMMG features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects may be programmed by the customer or designer to implement the CMMG features. A hierarchy of programmable interconnects allow logic blocks to be interconnected as desired by the CMMG administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. The CMMG may be developed on FPGAs and/or migrated into a fixed version that more resembles ASIC implementations. Alternate or coordinating implementations may migrate CMMG controller features to a final ASIC instead of or in addition to FPGAs. Embedded components and microprocessors may be considered the "CPU" and/or "processor" for the CMMG.

Power Source

The power source 1186 may be of any form for powering electronic circuit board devices. Power cells may include alkaline, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1186 may be connected to at least one of the interconnected subsequent components of the CMMG platform thereby providing an electric current to all subsequent components. In one example, the power source 1186 is connected to the system bus component 1104. An outside power source 1186 may be connected across the I/O 1108 interface. For example, a USB and/or IEEE 1394 connection carries both data and power across the connection and is therefore a suitable source of power.

Interface Adapters

Interface bus(ses) 1107 may accept, connect, and/or communicate to a number of interface adapters, conventionally although not necessarily in the form of adapter cards, such as but not limited to: input output interfaces (I/O) 1108, storage interfaces 1109, network interfaces 1110, and/or the like. Optionally, cryptographic processor interfaces 1127 similarly may be connected to the interface bus. The interface bus provides for the communications of interface adapters with one another as well as with other components of the computer systemization. Interface adapters are adapted for a compatible interface bus. Interface adapters may connect to the interface bus via a slot architecture. Some slot architectures may include: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1109 may accept, communicate, and/or connect to a number of storage devices such as, but not limited to: storage devices 1114, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1110 may accept, communicate, and/or connect to a communications network 1113. Through a communications network 1113, the CMMG controller is accessible through remote clients 1133b (e.g., computers with web browsers) by users 1133a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed CMMG), architectures may similarly be employed to pool, load balance, and/or otherwise increase the communicative bandwidth required by the CMMG controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 410 may be used to engage with various communications network types 1113. For example, multiple network interfaces may be employed to allow for the communication over broadcast, multicast, and/or unicast networks.

Input Output interfaces (I/O) 1108 may accept, communicate, and/or connect to user input devices 1111, peripheral devices 1112, cryptographic processor devices 1128, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 1111 often are a type of peripheral device 1112 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 1112 may be connected and/or communicate to I/O and/or other facilities of the like such as network interfaces, storage interfaces, directly to the interface bus, system bus, the CPU, and/or the like. Peripheral devices may be external, internal and/or part of the CMMG controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 1128), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the CMMG controller may be embodied as an embedded, dedicated, and/or monitor-less (i.e., headless) device, wherein access would be provided over a network interface connection.

Cryptographic units such as, but not limited to, microcontrollers, processors 1126, interfaces 1127, and/or devices 1128 may be attached, and/or communicate with the CMMG controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 1129. However, memory is a fungible technology and resource, thus, any number of memory embodiments may be employed in lieu of or in concert with one another. It is to be understood that the CMMG controller and/or a computer systemization may employ various forms of memory. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory will include ROM 1106, RAM 1105, and a storage device 1114. A storage device 1114 may be any conventional computer storage. Storage devices may include a (fixed and/or removable) magnetic disk drive; a magneto-optical drive; an optical drive (i.e., Bluray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory may contain a collection of program and/or database components and/or data such as, but not limited to: operating system component(s) 1115 (operating system); information server component(s) 1116 (information server); user interface component(s) 1117 (user interface); Web browser component(s) 1118 (Web browser); database(s) 1119; mail server component(s) 1121; mail client component(s) 1122; cryptographic server component(s) 1120 (cryptographic server); the CMMG component(s) 1135; and/or the like (i.e., collectively a component collection). These components may be stored and accessed from the storage devices and/or from storage devices accessible through an interface bus. Although non-conventional program components such as those in the component collection, typically, are stored in a local storage device 1114, they may also be loaded and/or stored in memory such as: peripheral devices, RAM, remote storage facilities through a communications network, ROM, various forms of memory, and/or the like.

Operating System

The operating system component 1115 is an executable program component facilitating the operation of the CMMG controller. Typically, the operating system facilitates access of I/O, network interfaces, peripheral devices, storage devices, and/or the like. The operating system may be a highly fault tolerant, scalable, and secure such as: Apple Macintosh OS X (Server); AT&T Plan 9; Be OS; Unix and Unix-like distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. Other operating systems may also be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the CMMG controller to communicate with other entities through a communications network 1113. Various communication protocols may be used by the CMMG controller as a subcarrier transport mechanism for interaction, such as, but not limited to: multicast, TCP/IP, UDP, unicast, and/or the like.

Information Server

An information server component 1116 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the CMMG controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the CMMG database 1119, operating systems, other program components, user interfaces, Web browsers, and/or the like.

Access to the CMMG database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the CMMG. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the CMMG as a query. Upon generating query results from the query, the results are passed over the bridge mechanism, and may be parsed for formatting and generation of new results Web page by the bridge mechanism. Such a new results Web page is then provided to the information server, which may supply it to the requesting Web browser.

Also, an information server may contain, communicate, generate, obtain, and/or provide program component, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 1117 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components through textual and/or graphical facilities. The user interface provides a facility through which users may affect, interact, and/or operate a computer. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, user, and/or data communications, requests, and/or responses.

Web Browser

A Web browser component 1118 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, user, and/or data communications, requests, and/or responses. Also, in place of a Web browser and information server, a combined application may be developed to perform similar operations of both. The combined application would similarly affect the obtaining and the provision of information to users, user agents, and/or the like from the CMMG enabled nodes.

Mail Server

A mail server component 1121 is a stored program component that is executed by a CPU 1103. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the CMMG.

Access to the CMMG mail may be achieved through a number of APIs offered by the individual Web server components and/or the operating system.

Also, a mail server may contain, communicate, generate, obtain, and/or provide program component, user, and/or data communications, requests, information, and/or responses.

Mail Client

A mail client component 1122 is a stored program component that is executed by a CPU 1103. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, user, and/or data communications, requests, information, and/or responses. Generally, the mail client provides a facility to compose and transmit electronic mail messages.

Cryptographic Server

A cryptographic server component 1120 may include a stored program component that is executed by a CPU 1103, cryptographic processor 1126, cryptographic processor interface 1127, cryptographic processor device 1128, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component is operable to facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the CMMG may encrypt all incoming and/or outgoing communications and may serve as node within a virtual private network (VPN) with a wider communications network. The cryptographic component is operable to facilitate the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to enable the CMMG component to engage in secure transactions if so desired. The cryptographic component facilitates the secure accessing of resources on the CMMG and facilitates the access of secured and/or remote resources For example, the cryptographic component may act as a client and/or server of secured resources. In one embodiment, the cryptographic component communicates with information servers, operating systems, other program components, and/or the like. The cryptographic component may contain, communicate, generate, obtain, and/or provide program component, user, and/or data communications, requests, and/or responses.

The CMMG Database

The CMMG database component 1119 may be embodied in a database and its stored data. The database may include a stored program component, which may be executed by the CPU; the stored program component portion configuring the CPU to process the stored data. The database may be a conventional, fault tolerant, relational, scalable, secure database such as Oracle or Sybase. Relational databases may include extensions of a flat file(s). Relational databases may comprise a series of related tables. In some embodiments, the tables may be interconnected or associated via a key field. Use of the key field allows the combination of the tables by indexing against the key field; i.e., the key fields act as dimensional pivot points for combining information from various tables. Relationships generally identify links maintained between tables by matching primary keys. Primary keys may represent fields that uniquely identify the rows of a table in a relational database. More precisely, they uniquely identify rows of a table on the "one" side of a one-to-many relationship.

In one embodiment, the CMMG database may be implemented using various standard data-structures, such as an array, hash, (linked) list, structured document or text file (e.g., XML), table, and/or the like. Such data-structures may be stored in memory and/or in (structured) files. In one embodiment, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases where objects may include encapsulated capabilities. If the CMMG database is implemented as a data-structure, the use of the CMMG database 1119 may be integrated into another component such as the CMMG component 1135. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1119 includes several tables 1119*a-f*. A user table 1119*a* includes fields such as, but not limited to: user_name, user_identifier, user_crew and/or the like. The user table may support and/or track multiple user accounts on the CMMG platform.

A game table 1119*b* includes fields such as, but not limited to: game_identifier, game_type and/or the like. The game table may support and/or track multiple game accounts on the CMMG platform.

A crew table 1119*c* includes fields such as, but not limited to: crew_identifier, crew_type, crew_sector, crew_goal and/or the like. The crew table may support and/or track multiple crew on the CMMG platform.

A progress table 1119*d* includes fields such as, but not limited to: progress_identifier, progress_associations, progress_index and/or the like. The progress table may support and/or track multiple progress bars on the CMMG platform.

A content_item table 1119*e* includes fields such as, but not limited to: content_item_identifier, content_item_associations, content_item_type, content_item_price, content_item_progress, content_item_analytics and/or the like. The content_item table may support and/or track multiple content_item accounts on the CMMG platform.

An exchange 1119*f* table includes fields such as, but not limited to: exchange_identifier, exchange_type, exchange_routing_number, exchange_bank, exchange_credits, exchange_transfer, exchange_deposit_account and/or the like. The exchange table may support and/or track multiple exchange accounts on the CMMG platform.

A status table 1119*g* includes fields such as, but not limited to: status_identifier, status_type, status_user, status_crew, status_feed and/or the like. The status table may support and/or track multiple framework accounts on the CMMG platform.

A social_graph table 1119*h* includes fields such as, but not limited to FBML_tags, SN_API calls, stream_queues, associated_uids, user_app_permissions, request_AppUser_calls, publish_streams, instant_messages, message_channels, ui_frame, ui_canvas, scaffold_classes and/or the like. The social_graph table may support and/or track multiple social_graphs, APIs, and/or scripting languages.

In one embodiment, the CMMG database may interact with other databases. For example, employing a distributed database, queries and data access by search CMMG component may treat the combination of the CMMG database, an integrated data security layer database as a single database entity.

In one embodiment, user programs may contain various user interface primitives, which may serve to update the CMMG. Also, various accounts may require custom database tables depending upon the environments and the types of clients the CMMG may have to serve. It should be noted that any unique fields may be designated as a key field throughout. In an alternative embodiment, these tables have been decentralized into their own databases and their respective database controllers (i.e., individual database controllers for each of the above tables). Employing advantageous data processing techniques, one may further distribute the databases over several storage devices. Similarly, configurations of the decentralized database controllers may be varied by consolidating and/or distributing the various database components 1119. The CMMG may be configured to keep track of various settings, inputs, and parameters via database controllers.

The CMMG database may communicate to and/or with other components in a component collection, including itself, and/or facilities of the like. Most frequently, the CMMG database communicates with the CMMG component, other program components, and/or the like. The database may contain, retain, and provide information regarding other nodes and data.

The CMMG Component

The CMMG component 1135 is a stored program component that is executed by a CPU. In one embodiment, the CMMG component incorporates any and/or all combinations of the aspects of the CMMG that was discussed in the previous figures. As such, the CMMG affects accessing, obtaining and the provision of information, services, transactions, and/or the like across various communications networks.

In one embodiment, the CMMG platform transforms in game status of a user's social content item, via CMMG components 1135 into a content item with layered integration of additional content indicative of status.

The CMMG component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the CMMG server employs a cryptographic server to encrypt and decrypt communications. The CMMG component may communicate to and/or with other components in a component collection, including itself, and/or facilities of the like. Most frequently, the CMMG component communicates with the CMMG database, operating systems, other program components, and/or the like. The CMMG may contain, communicate, generate, obtain, and/or provide program component, user, and/or data communications, requests, and/or responses.

Distributed CMMGs

The structure and/or operation of any of the CMMG node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through advantageous data processing communication techniques.

The configuration of the CMMG controller may depend on the context of implementation. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of implementation.

For example, in some implementations, the CMMG controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

Also, the following resources may be used to provide example embodiments regarding SOAP parser implementation:

http://www.xay.com/perl/site/lib/SOAP/Parser.html
http://publib.boulder.ibm.com/infocenter/tivihelp/v2r1/index.jsp?topic=/com.ibm.IBMDI.doc/referenceguide295.htm
and other parser implementations:
http://publib.boulder.ibm.com/infocenter/tivihelp/v2r1/index.jsp?topic=/com.ibm.IBMDI.doc/referenceguide259.htm
all of which are hereby expressly incorporated by reference.

In order to address various issues and advance the art, the entirety of this application shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular wants and/or characteristics of a CMMG individual and/or enterprise user, database configuration and/or relational model, data type, data transmission and/or network framework, syntax structure, and/or the like, various embodiments of the CMMG, may be implemented that enable a great deal of flexibility and customization. For example, aspects of the CMMG may be adapted for dedicating processor power to online scalable processes, e.g. SETI. While various embodiments and discussions of the CMMG have been directed social gaming mechanics, however, it is to be understood that the embodiments described herein may be readily configured and/or customized for a wide variety of other applications and/or implementations.

What is claimed is:

1. A computer-implemented method, comprising:
sending, from the one or more servers to a client of a user, data for displaying a crew assembly dialog that includes a graphical user interface (GUI), the crew assembly dialog allowing the user to select crew members for assembling the crew for the online game;
sending, from the one or more servers in response to a selection made at the GUI, a help request directed to the at least one crew member for response from the at least one crew member;
assembling the crew based on the selection of the user for the at least one crew member and response of the at least one crew member to the help request, said assembling of the crew enables the user to make progress in the online game.

2. The method of claim 1, wherein said progress in the online game enables access to a content item for use by the user in the online game.

3. The method of claim 1, further comprising:
determining that the crew is insufficient based on the response to the help request and based on gating rules for the crew; and
providing a notification to the user of said determination that the crew is insufficient.

4. The method of claim 1, wherein the crew assembly dialog further includes an indication of a progress associated with assembling a crew that is sufficient to make said progress in the online game.

5. The method of claim 1, wherein the crew assembly dialog includes an interface for allowing the user to pay for accessing a content item without making said progress in the online game.

6. The method of claim 1, wherein the help request is associated with a goal in the online game to be accomplished by completing a collaborative task within the online game.

7. The method of claim 6, wherein the help request includes a message indicating that the at least one crew member will be rewarded in response to completing the goal with the user.

8. The method of claim 7, wherein the at least one crew member is rewarded after said detecting completion of the goal by the crew.

9. The method of claim 1, wherein said sending the help request message is accomplished at least partially through a social network accessed via an application programming interface (API).

10. The method of claim 1, wherein the online game is a multiplayer game in a distributed game architecture.

11. Computer program instructions for executing a method associated with an online game, the computer program instructions being non-transitory, comprising:
program instructions for sending, from the one or more servers to a client of a user, data for displaying a crew assembly dialog that includes a graphical user interface (GUI), the crew assembly dialog allowing the user to select crew members for assembling the crew for the online game;
program instructions for sending, from the one or more servers in response to a selection made at the GUI, a help request directed to the at least one crew member for response from the at least one crew member;
program instructions for assembling the crew based on the selection of the user for the at least one crew member and response of the at least one crew member to the help request, said assembling of the crew enables the user to make progress in the online game.

12. The computer readable media of claim 11, wherein said progress in the online game enables access to a content item for use by the user in the online game.

13. The computer readable media of claim 11, further comprising:
program instructions for determining that the crew is insufficient based on the response to the help request and based on gating rules for the crew; and
program instructions for providing a notification to the user of said determination that the crew is insufficient.

14. The computer readable media of claim 11, wherein the crew assembly dialog further includes an indication of a progress associated with assembling a crew that is sufficient to make said progress in the online game.

15. The computer readable media of claim 11, wherein the crew assembly dialog includes an interface for allowing the user to pay for accessing a content item without making said progress in the online game.

16. The computer readable media of claim 11, wherein the help request is associated with a goal in the online game to be accomplished by completing a collaborative task within the online game.

17. The computer readable media of claim 16, wherein the help request includes a message indicating that the at least one crew member will be rewarded in response to completing the goal with the user.

18. The computer readable media of claim 17, wherein the at least one crew member is rewarded after said detecting completion of the goal by the crew.

19. The computer readable media of claim 11, wherein said sending the help request message is accomplished at least partially through a social network accessed via an application programming interface (API).

* * * * *